(12) United States Patent
Gutzweiler (10) Patent No.: US 11,209,389 B2
(45) Date of Patent: Dec. 28, 2021

(54) IMMOBILIZING FLUIDIC SAMPLE FOR INHIBITING SPATIAL BROADENING

(71) Applicant: Agilent Technologies, Inc., Santa Clara, CA (US)

(72) Inventor: Ludwig Gutzweiler, Freiburg (DE)

(73) Assignee: Agilent Technologies, Inc., Santa Clara, CA (US)

( * ) Notice: Subject to any disclaimer, the term of this patent is extended or adjusted under 35 U.S.C. 154(b) by 131 days.

(21) Appl. No.: 16/409,356

(22) Filed: May 10, 2019

(65) Prior Publication Data
US 2019/0346405 A1 Nov. 14, 2019

(30) Foreign Application Priority Data
May 11, 2018 (EP) .................... 18171820

(51) Int. Cl.
*G01N 27/447* (2006.01)
*B01D 15/36* (2006.01)
*B01L 3/00* (2006.01)

(52) U.S. Cl.
CPC ..... *G01N 27/44704* (2013.01); *B01D 15/361* (2013.01); *B01L 3/502715* (2013.01); *B01L 2400/0415* (2013.01)

(58) Field of Classification Search
CPC ............. G01N 27/44704; G01N 30/06; G01N 27/44747; G01N 27/44743; B01D 15/361; B01D 15/10; B01L 3/502715; B01L 2400/0415; B01L 3/502784; B01L 2300/0864; B01L 2300/087; B01L 2400/0421; B01L 3/502753
See application file for complete search history.

(56) References Cited

U.S. PATENT DOCUMENTS

| | | | |
|---|---|---|---|
| 4,861,448 A | 8/1989 | Cantor et al. | |
| 8,277,761 B2* | 10/2012 | Falk-Jordan | ........ B01L 3/50273 422/527 |
| 2003/0116437 A1* | 6/2003 | Burns | .............. G01N 27/44743 204/453 |
| 2013/0043150 A1* | 2/2013 | Ohashi | ................ C12Q 1/6806 206/223 |
| 2014/0014515 A1* | 1/2014 | Santiago | ............ G01N 27/4473 204/549 |
| 2015/0027889 A1 | 1/2015 | Pollack et al. | |
| 2016/0102341 A1* | 4/2016 | Curran | ................... G01N 35/08 506/32 |
| 2017/0218355 A1* | 8/2017 | Buie | ................... B01L 3/50273 |

(Continued)

FOREIGN PATENT DOCUMENTS

| | | |
|---|---|---|
| EP | 1577012 B1 | 11/2014 |
| WO | 2008014825 A1 | 2/2008 |

OTHER PUBLICATIONS

Extended European Search Report issued in counterpart EP Application No. 18171820.6 dated Dec. 13, 2018 (eight (8) pages).

(Continued)

*Primary Examiner* — Joshua L Allen (57) ABSTRACT

A method of handling a fluidic sample in a sample separation device includes at least partly immobilizing the fluidic sample by an immobilizing agent inhibiting spatial broadening of the fluidic sample, and subsequently at least partly releasing the fluidic sample from the immobilizing agent.

20 Claims, 2 Drawing Sheets

(56) References Cited

U.S. PATENT DOCUMENTS

2018/0106805 A1* 4/2018 Allen .................... C12M 47/04
2020/0038867 A1* 2/2020 Baroud ............... B01F 13/0083

OTHER PUBLICATIONS

Gutzweiler et al., "Open microfluidic gel electrophoresis: Rapid and low cost separation and analysis of DNA at the nanoliter scale", 2017, Electrophoresis, vol. 38, pp. 1764 to 1770.
Gutzweiler, Ludwig et al. "Large Scale Production and controlled deposition of single HUVEC spheroids for bioprinting applications." Biofabrication, vol. 9, No. 2, Jun. 1, 2017.

* cited by examiner

IMMOBILIZING FLUIDIC SAMPLE FOR INHIBITING SPATIAL BROADENING

RELATED APPLICATIONS

This application claims the benefit under 35 U.S.C. 119 of European Patent Office Application No. EP 18171820.6, filed May 11, 2018, titled "IMMOBILIZING FLUIDIC SAMPLE FOR INHIBITING SPATIAL BROADENING," the content of which is incorporated by reference herein in its entirety.

TECHNICAL FIELD

The present invention relates to a method of handling a fluidic sample in a sample separation device, and to a sample separation device.

BACKGROUND ART

In liquid chromatography, a fluidic sample and an eluent (liquid mobile phase) may be pumped through conduits and a separation unit such as a column in which separation of sample components takes place. The column may comprise a material which is capable of separating different components of the fluidic sample. The separation unit may be connected to other fluidic members (like a sampler or an injector, a detector) by conduits. Before the fluidic sample is introduced into a separation path between a fluid drive unit (in particular a high pressure pump) and the separation unit, a predefined amount of fluidic sample shall be intaken from a sample source (such as a sample container) via an injection needle into a sample loop by a corresponding movement of a piston within a metering device. Thereafter, an injector valve is switched so as to introduce the intaken amount of fluidic sample from the sample loop of a metering path into the separation path between fluid drive unit and the separation unit for subsequent separation.

Another sample separation technique is gel electrophoresis. Gel electrophoresis is a method for separation and analysis of a fluidic sample comprising for example macromolecules (such as DNA and proteins) and their fragments, based on their size and charge. Different fractions of a fluidic sample (such as different nucleic acid molecules) are separated by applying an electric field to move the negatively charged molecules through a gel medium (such as agarose or other substances). Shorter molecules move faster and migrate farther than longer ones because shorter molecules migrate more easily through the pores of the gel.

WO 2008/014825 discloses a fluidic device comprising a substrate (for instance a glass substrate) and a transport medium (for instance a gel) provided (for instance printed) on the substrate to define a transport path for transporting a fluidic sample (for instance a biochemical liquid to be analyzed) driven by an external source (for example an electric force by applying an electric voltage to electric contact pins to be coupled electrically to the transport medium in an electrophoresis application).

Gutzweiler et al., "Open microfluidic gel electrophoresis: Rapid and low cost separation and analysis of DNA at the nanoliter scale", 2017, Electrophoresis, volume 38, pages 1764 to 1770 discloses conducting on-demand electrophoretic separations of DNA molecules in open microfluidic systems on planar polymer substrates. The open microfluidic separation system comprises two opposing reservoirs, a semi-contact written gel line acting as separation channel interconnecting the reservoirs and sample injected into the line via non-contact droplet dispensing.

However, the phenomenon of spatial broadening of a fluidic sample before and during separation, for instance in a waiting time before separation, may deteriorate spatial accuracy of sample separation in the above mentioned and other sample separation devices.

SUMMARY

It is an object of the invention to enable sample separation with high accuracy.

According to an exemplary embodiment of the present invention, a method of handling a fluidic sample in a sample separation device is provided, wherein the method comprises at least partly immobilizing (in particular inhibiting free motion of) the fluidic sample by an immobilizing agent (in particular by forming at least one bead comprising fluidic sample and immobilized immobilizing agent) inhibiting spatial broadening of the fluidic sample, and subsequently at least partly releasing or removing the fluidic sample from the (in particular bead comprising the) immobilizing agent (in particular to restore or re-establish free movability of the fluidic sample).

According to another exemplary embodiment, a sample separation device for separating a fluidic sample is provided, wherein the device comprises an immobilization unit configured for at least partly immobilizing the fluidic sample by an immobilizing agent inhibiting spatial broadening of the fluidic sample.

In the context of this application, the term "fluidic sample" may particularly denote any liquid and/or gaseous medium, optionally including also solid particles, which is to be analyzed. Such a fluidic sample may comprise a plurality of fractions of molecules or particles which shall be separated, for instance small mass molecules or large mass biomolecules such as proteins. Separation of a fluidic sample into fractions involves a certain separation criterion (such as electric charge, mass, volume, chemical properties, etc.) according to which a separation is carried out. For instance, such a fluidic sample may be a biological sample which may comprise components to be separated, such as proteins and/or DNA.

In the context of this application, the term "sample separation device" may particularly denote any apparatus which is capable of separating different fractions of a fluidic sample by applying a certain separation technique, in particular gel electrophoresis or liquid chromatography.

In the context of the present application, the term "immobilizing a fluidic sample" may particularly denote limiting or restricting the freedom of the fluidic sample to freely spatially move in any desired direction. An immobilized fluidic sample may thus be incapable of freely spontaneously moving relative to the immobilized immobilizing agent. Immobilizing the fluidic sample may thus be a process of reducing or inhibiting the mobility of the fluidic sample, up to a complete disabling of any motion of the fluidic sample which may otherwise result in a broadening of the same. For example, immobilizing the fluidic sample may be accomplished by converting the fluidic sample and/or a medium carrying or surrounding the fluidic sample into a phase in which no free motion of particles is possible (for instance by gelling or freezing the sample and/or a surrounding thereof into a gel phase or a solid phase).

In the context of the present application, the term "immobilizing agent" may particularly denote a medium (in particular a substance or a number of functionally cooperating substances) capable of triggering immobilization of the fluidic sample. Such an immobilizing agent may be a single constituent which changes a phase state of itself and/or of the fluidic sample upon contacting or interacting with the fluidic sample. It is however also possible that the immobilizing agent comprises a first constituent (preferably to be mixed with the fluidic sample) and comprises a second constituent. The second constituent may be configured so that when it comes into contact or interaction with the first constituent, immobilization is triggered. When the fluidic sample is spatially close to the constituents at the time of the interaction, the fluidic sample may be immobilized when the constituents are immobilized.

In the context of the present application, the term "immobilizing unit" may particularly denote a member, a kit or a mechanism capable of triggering immobilization of the fluidic sample.

According to an exemplary embodiment of the invention, a system is provided in which a fluidic sample may be temporarily prevented from freely moving in a surrounding medium. This temporary immobilization of the fluidic sample may be accomplished by an immobilizing agent located spatially so close to the sample that immobilization of the immobilizing agent also affects the fluidic sample. While in the immobilized state, the immobilizing agent and the fluidic sample may be safely and reliably prevented from spatially broadening or diffusing. An unlimited and pronounced spatial broadening of a fluidic sample may be undesired in terms of sample separation because it may reduce the separation accuracy. Advantageously, such undesired effects may be efficiently suppressed by exemplary embodiments. For instance, before initiating a sample separation process, it may be desired to carry out preparation processes. In a corresponding waiting phase, the fluidic sample may be kept temporarily immobilized by the immobilizing agent so that undesired spatial broadening or defocusing of the fluidic sample may be inhibited. After having completed the preparation process and started the separation process, the sample may be removed or released from the immobilizing agent. In terms of this sample removal procedure, the immobilizing agent may remain immobilized (while the sample may be actively enabled to move through the immobilizing agent) or the immobilizing agent may be disintegrated (so that the motion inhibiting barrier function of the immobilizing agent is lost). The latter can be a time-dependent passive disintegration process (like degradation) or an active disintegration process by applying a force disabling the motion inhibiting function barrier (like electrokinetic forces for instance leading to migration of at least one immobilizing agent constituent). Hence, the fluidic sample may be enabled in a controllable way to again freely move and to be separated in accordance with a separation mechanism of the respective sample separation device.

In the following, further embodiments of the microfluidic device and the method will be explained.

In an embodiment, it is possible to overcome the barrier in the form of the immobilized immobilizing agent actively and/or passively for re-mobilizing the fluidic sample. For instance, overcoming the barrier actively may be carried out by triggering the fluidic sample to migrate through the immobilized phase or immobilizing agent. Passively overcoming the barrier may be accomplished for instance by dissolving the immobilized immobilizing agent or phase due to degradation and/or diffusion. The latter dissolving can be obtained for example by the supply of thermal energy (for instance for melting) or the supply of electrokinetic energy (for instance causing ion migration and consequently dissolution of ionic interactions).

In an embodiment, the method comprises triggering the release by actively applying a release force (in particular by applying an electric release force and/or a centrifugal force) triggering migration (in particular diffusion) of at least part of the fluidic sample out of (in particular through) the immobilized immobilizing agent. Correspondingly, the device may comprise a release unit for subsequently (i.e. after immobilization) at least partly releasing the fluidic sample from the immobilizing agent. Such a release unit may be configured for generating and applying the above mentioned release force to the immobilized immobilizing agent with the fluidic sample immobilized therein. For instance, the release unit may be configured for releasing the fluidic sample from the immobilizing agent by applying an electric field. Highly advantageously, an electric field generation unit (such as a voltage source) which is anyhow present in an electrophoresis separation device may be used also for releasing the fluidic sample. It has turned out that the application of an electric field to a bead or other structure comprising immobilized immobilizing agent as well as (in particular electrically charged) fluidic sample immobilized therein surprisingly forces the particles of the fluidic sample to selectively move out of and through the matrix of the immobilizing agent into surrounding (in particular fluidic) medium. Thus, in particular without additional hardware effort, it may be possible in a simple way to re-mobilize the fluidic sample after a temporary immobilization by the mere application of an electric field. Hence, it has turned out that the fluidic sample can be forced to leave the immobilized immobilizing agent by applying an electric field. This is a simple and efficient as well as highly selective way of removing the fluidic sample from the immobilizing agent. Alternatively, the release force may be different from an electric force, for instance may be a magnetic force.

In an embodiment, the method comprises actively triggering the release by at least partly disintegrating the immobilizing agent, in particular thermally, electrically and/or chemically. Correspondingly, the device may comprise a disintegration unit which may be configured for triggering an at least partial disintegration of the immobilizing agent after the immobilizing to thereby release the fluidic sample. In the context of the present application, the term "disintegrating" the immobilizing agent may particularly denote a process of intentionally removing, destroying, dissolving, transforming or otherwise manipulating at least part of the immobilizing agent in an immobilizing condition so that the immobilizing agent no longer acts as a motion preventing barrier for the fluidic sample. For instance, the immobilizing agent may, in one state thereof, form a matrix and/or shell for the fluidic sample preventing spatial broadening or defocusing of the fluidic sample. Upon disintegrating the immobilizing agent from this state, such an inhibition of spatial broadening or defocusing of the fluidic sample may be partially or entirely terminated. This can be accomplished for instance by a phase transition of the immobilizing agent from an immobilizing phase into another phase enabling the fluidic sample to freely or substantially freely move. For instance, an immobilizing agent may be solidified by cooling, for instance using a Peltier element, for immobilization. For releasing or removing the fluidic sample from the immobilizing agent, the latter may be heated so as to become liquid, thereby disintegrating the previously solid immobilizing agent. Thus, it may be possible to thermally trigger disintegration, for example by raising a temperature of the immobilized immobilizing agent above a melting point to thereby render it liquid. It is also possible to add one or more chemical agents, configured for dissolving or liquefying the immobilized immobilizing agent for the sake of disintegration. It may also be possible to weaken or cancel ionic interactions resulting in an immobilization in a reversible way by electrostatic forces. This may be due to the fact that ions may have the tendency of migrating towards a corresponding pole in an electric field (in particular depending on the strength of the electric field).

In an embodiment, the method comprises at least partly releasing the fluidic sample from the immobilizing agent by passively waiting for a spontaneous disintegration of the immobilizing agent. It has turned out that the immobilized immobilizing agent disintegrates on its own terms within a certain time constant, for instance typically within several ten minutes.

In an embodiment, the immobilizing comprises embedding at least part of the fluidic sample in the immobilizing agent and/or enclosing at least part of the fluidic sample by the immobilizing agent. In other words, the immobilizing agent may form a continuous spatial matrix within which the fluidic sample may be accommodated. When the immobilizing agent is then converted into an immovable phase, also motion of the embedded fluidic sample is prevented. However, the immobilizing agent may, additionally or alternatively, form a shell around the fluidic sample, wherein the shell may be—in the absence of a release force—impermeable for the fluidic sample (for instance when the shell is solid and usually impermeable). Also such an exterior shell which may be located hermetically closed around the fluidic sample may reliably prevent spatial broadening or other diffusing or defocusing effects of the fluidic sample. The fact whether the immobilizing agent forms a continuous matrix or a hollow shell may depend on the chemical composition of the constituent(s) of the immobilizing agent, the surrounding medium, the properties of the sample, the process control, etc.

In an embodiment, the method comprises triggering an immobilizing phase transition of the immobilizing agent for immobilizing the fluidic sample. In this context, the term "immobilizing phase transition" may particularly denote a phase transition of the immobilizing agent (in particular in combination with the fluidic sample) which activates the immobilized state of the fluidic sample. For instance, the immobilizing agent may be converted from a previously liquid state into a gel or solid state for the mentioned purpose. The phase transition of the immobilizing agent may then result in the immobilization of the fluidic sample.

In an embodiment, the method comprises triggering the immobilizing phase transition of the immobilizing agent into one of the group consisting of a solid phase, a gel phase, and a high viscous phase. In a solid, gel with very small pore sizes or other phase with very high viscosity, the fluidic sample is unable to freely move which equals to a temporary immobilization of the fluidic sample. The immobilizing phase change may be triggered externally, for instance by triggering a chemical reaction, by changing the temperature (in particular by reducing the temperature) and/or the pressure, by changing the pH value, by applying a magnetic field, etc.

In an embodiment, the method comprises triggering a disintegrating phase change of the immobilizing agent for disintegrating the immobilizing agent. In the context of the present invention, the term "disintegrating phase change" may particularly denote a phase change of the immobilizing agent by which its function as a matrix or a shell acting as barrier for the fluidic sample is disintegrated, destroyed or removed. In other words, the disintegrating phase change may transform the immobilizing agent and consequently the fluidic sample in interaction therewith from an immobilized state into a movable or flowable state.

In an embodiment, the mentioned disintegration may be promoted or triggered by the addition of one or more release agents. One example for such an embodiment is the use of a substance capable of gelling at an appropriate pH value, wherein this substance may be converted back from the gel phase into another phase (for instance a liquid phase) by supplying an appropriate release agent (such as an acid or a base). In yet another embodiment, it is also possible to supply an additive capable of gelling.

In an embodiment, the method comprises triggering the disintegrating phase transition of the immobilizing agent into one of the group consisting of a liquid phase, a gaseous phase, and a low viscous phase. Thus, the disintegrating phase transition may convert the immobilizing agent into a liquid, a gas or another phase with low viscosity enabling the immobilizing agent itself as well as the fluidic sample therein to again freely move.

In an embodiment, the disintegrating phase change for disintegrating the immobilizing agent is inverse to the immobilizing phase change of the immobilizing agent for immobilizing the fluidic sample. In other words, the immobilizing phase change may convert the immobilizing agent and/or the fluidic sample in interaction therewith from a movable state or phase into an immovable state or phase. The inverse process of transferring the immobilizing agent and/or the fluidic sample therein back to a movable or flowable state by carrying out the disintegrating phase transition will bring back the immobilizing agent and the fluidic sample in the state as it was before carrying out the immobilizing phase transition. Thus, the process of immobilizing may be reversible, once or multiple times.

In an embodiment, at least partly immobilizing the fluidic sample is carried out before and/or after separating the fluidic sample. When immobilizing the fluidic sample prior to separation, it is for instance possible to bridge a waiting time until sample separation starts without the risk of spatial broadening of the fluidic sample due to diffusion or the like. However, it is also possible to immobilize the fluidic sample or selectively a fraction or portion thereof after completion of a separation procedure or part thereof. When a fraction of the fluidic sample has been separated from a rest of the fluidic sample, immobilizing of only this fraction keeps the corresponding sample portion together, by the immobilized immobilizing agent. This can be advantageous in terms of fractioning, for example. It is also possible to temporarily immobilize an already separated fluidic sample for potential further analysis to be carried out after separation of the individual constituents or fractions. Also waiting times during detection will not result in an undesired spatial broadening of the separated fluidic sample in such an event. Re-immobilized separated sample fractions can also be tested in comparison with a further injected fluidic sample. Also in terms of Western blotting, this may be advantageous.

In an embodiment, the method comprises forming at least one bead (such as a sphere-like body or a body or structure having another shape) composed of the fluidic sample and the immobilizing agent for immobilizing the fluidic sample. In the context of the present application, the term "bead" may particularly denote a droplet of liquid which is separated from a surrounding medium (such as a separation medium) by a phase transition (descriptively speaking in a similar way as a ball on a trampoline). However, a bead may also be a gelled sphere in which the sample is present and which is separated by a phase transition with regard to the surrounding medium (such as a separation medium). It is also possible that such bead is a droplet of liquid which is separated with regard to a surrounding medium (such as a separation medium) by a gel skin around the droplet, however the fluidic sample still being in a liquid phase in an interior of the gel skin. Such a bead may also be a frozen droplet of or comprising fluidic sample. Furthermore, a bead may be a solid body on which the fluidic sample adheres. For instance, the bead may have a largest dimension which is smaller than 5 mm, in particular smaller than 3 mm, more particularly smaller than 1 mm. In such an embodiment, the bead type compound of immobilizing agent and fluidic sample may be a confined physical structure by which the fluidic sample is kept spatially together as a whole within a limited spatial range.

In an embodiment, the method comprises shielding the immobilized fluidic sample with regard to a (for instance fluidic, in particular liquid and/or gaseous, or gel-like) medium in an environment of the immobilizing agent during maintaining the fluidic sample immobilized. The surrounding medium may for instance be a gel matrix in the example of gel electrophoresis or may be a liquid mobile phase (such as a solvent or solvent composition) in the example of liquid chromatography. While the fluidic sample may be normally able to move within such a medium, the immobilization caused by the immobilizing agent prevents this free motion temporarily, until the immobilizing agent is later disintegrated or removal of the fluidic sample from the immobilizing agent is enabled otherwise (for instance is enabled by an electric force).

In an embodiment, the method comprises contacting the fluidic sample with the mentioned medium by releasing the fluidic sample from the immobilizing agent. Hence, the process of disintegrating the immobilizing agent or enabling the fluidic sample to traverse the immobilized immobilizing agent may trigger a physical contact of the fluidic sample with the medium and may hence activate the capability of the fluidic sample to move within the fluidic or gel-like medium (for instance for separating different fractions of the fluidic sample).

In an embodiment, the fluidic sample is a biological sample. Such a biological sample may be particularly sensitive and prone to spatial broadening during a waiting phase, for instance needed for preparing an analysis of the fluidic sample in the sample separation device. For example, a biological sample may comprise proteins and/or DNA which may be separated. Examples for such a biological sample are a blood sample, orange juice, a biochemical preparation, a metabolite, a body fluid after digestion of a medicament, etc.

In an embodiment, the method may comprise—after the immobilizing—preparing a subsequent separation or analysis of the fluidic sample, and—after the preparing and after the releasing—carrying out the separation or analysis of the fluidic sample. After the releasing, removing or disintegrating, the fluidic sample is again able to freely move, in particular in terms of an analysis or a sample separation. Such a separation may for instance be carried out by electrophoresis (in particular gel electrophoresis) or chromatography (in particular liquid chromatography). In gel electrophoresis, it may be desired that a fluidic sample injected into a gel-type separation medium needs to wait (for instance one minute) until the preparation for starting the actual separation process is completed (an example for such a preparation process in terms of gel electrophoresis is the formation of an oil film). During a corresponding waiting time, an immobilization of the fluidic sample may prevent undesired spatial broadening of the fluidic sample due to effects such as strong diffusion or the like. In liquid chromatography, intaken fluidic sample can be temporarily stored in a sample loop or other sample accommodation volume, wherein the fluidic sample may only fill part of the sample accommodation volume. At an appropriate point of time, a fluidic valve may be switched to inject the intaken and temporarily stored fluidic sample from the sample accommodation volume into a flow path between a fluid drive and a sample separation unit. By temporarily immobilizing the fluidic sample in the immobilizing agent while the fluidic sample is in the sample accommodation volume, undesired spatial broadening of the fluidic sample developing in the waiting time until injection may be avoided. Other separation techniques may however be applied as well. Moreover, also other analysis procedures may be carried out, for instance the determination of a concentration of a constituent of the fluidic sample, or the determination of any other property of the fluidic sample.

In an embodiment, the method comprises applying the fluidic sample on a planar carrier, and subsequently applying a separation medium on the planar carrier and in interaction with the fluidic sample. Such a concept may be advantageous in terms of an open microfluidic architecture.

In an embodiment, the immobilizing agent comprises a first constituent and a second constituent (which may be stored initially separately from the first constituent) being configured so that the immobilizing agent is immobilized by an interaction, in particular by a chemical reaction, between the first constituent and the second constituent. The method may comprise triggering the immobilizing by mixing the fluidic sample with the first constituent, and subsequently injecting the mixture into a medium comprising the second constituent. When the first constituent is mixed with the fluidic sample prior to this injection and hence prior to the immobilizing, it can be ensured that the subsequent addition of the second constituent (which may trigger immobilization) is carried out in a state in which the sample is already in close spatial relationship with the first constituent. It can thus be ensured that triggering immobilization of the immobilizing agent will also significantly reduce movability of the fluidic sample being located within a range of immobilization.

In an embodiment, the medium carrying or containing the second constituent comprises a gel (for instance an electrophoresis gel, in particular on the basis of polyacrylamide) and/or a mobile phase (for instance a chromatographic mobile phase such as a solvent or solvent composition, for instance comprising an organic component like methanol or acetonitrile and an inorganic component such as water). Hence, the medium may be selected in accordance with the separation technology implemented for separating the fluidic sample into fractions.

In an embodiment, the first constituent is calcium chloride or calcium glucate lactate. However, a salt with another alkaline earth metal than calcium and/or with another halogen than chloride may be used as well. In an embodiment, the second constituent is sodium alginate. However, sodium can also be substituted by another alkaline metal, etc. Other combinations of first constituent and second constituent are possible as well. The first constituent and the second constituent should be selected so that only their interaction triggers the immobilization process. They may furthermore be configured so that the immobilization process is reversible, i.e. disintegration of the immobilized immobilizing agent is later possible by an exterior stimulus or by an intrinsic disintegrating behavior with a sufficiently long time constant of the immobilizing agent itself.

In an embodiment, the interaction triggering the immobilizing is an ion exchange between the first constituent and the second constituent. The term "ion exchange" may denote an exchange of ions between the two chemicals in form of the first constituent and the second constituent. More specifically, sodium ions of sodium alginate may be substituted by calcium ions of the calcium chloride. Such anion exchange may trigger the formation of the gel phase of the immobilizing agent in which the fluidic sample may be immobilized.

In an embodiment, the interaction triggering the immobilizing is a hydrogel formation under participation of the first constituent and the second constituent. In the context of the present application, the term "hydrogel" may particularly denote a network of polymer chains that are hydrophilic, for instance a colloidal gel in which water is a dispersion medium. Hydrogels may be highly absorbent (they can contain over 90% water) natural or synthetic polymeric networks. Forming a hydrogel in which the fluidic sample is embedded is one embodiment of the immobilization process preventing spatial broadening of a sample plug.

In another embodiment, the first constituent is thrombin, and the second constituent is fibrinogen. A thrombin-catalyzed conversion of fibrinogen to fibrin can involve three reversible steps, with thrombin being involved in only the first step which is a limited proteolysis to release fibrinopeptides from fibrinogen to produce fibrin monomer. In the second step, fibrin monomers form intermediate polymers through noncovalent interactions. In the third step, the intermediate polymers aggregate to form the fibrin clot. In the described embodiment, the fluidic sample may be immobilized within such a clot. Since the described process is reversible, it is possible to selectively immobilize the fluidic sample in a fibrin bead or release the fluidic sample from the fibrin. Hence, the above described process involving sodium alginate and calcium chloride is only a—however preferred—embodiment and example for an immobilization of fluidic sample according to an embodiment of the invention. For example, one of thrombin and fibrinogen may be mixed (or premixed) with the fluidic sample, whereas the other one of thrombin and fibrinogen may be mixed (or premixed) with the separation medium (such as gel in the example of gel electrophoresis or a solvent composition in the example of liquid chromatography).

In still another embodiment, the first constituent is a polymerizable substance, and the second constituent is a cross-linking agent, or vice versa. More generally, the immobilization process can be realized by in situ polymerization. For example, it is possible to add a polymerizable substance to the separation medium which substance polymerizes upon contact with the cross-linking agent (which may be mixed with the fluidic sample) and thus fixes or immobilizes the fluidic sample. In yet another embodiment, it is possible to trigger such a polymerization of a polymerizable immobilizing agent by another stimulus mechanism, such as the supply of ultraviolet radiation, thermal energy, chemical agents, etc. Polymerization may also be triggered only locally.

However, it should be said that exemplary embodiments of the invention may use multiple mechanisms for immobilizing an immobilizing agent and fluidic sample in interaction with such an immobilizing agent or part thereof.

The following Table gives an overview of immobilizing agents and constituent thereof which may be used according to different exemplary embodiments of the invention:

| Name | Constituent(s) | Mechanism | Description |
| --- | --- | --- | --- |
| Alginate | Calcium chloride and sodium alginate | Ionic formation of hydrogel | Addition of calcium chloride to the fluidic sample and of sodium alginate to a separation medium (or vice versa); ion exchange between sodium and calcium forms a hydrogel |
| Fibrin | fibrinogen and thrombin | Enzymatic formation of hydrogel | Addition of fibrinogen to the fluidic sample and of thrombin to a separation medium (or vice versa) |
| Agarose | agarose | Thermal formation of hydrogel | Addition of agarose to the fluidic sample or to the separation medium; gelling of agarose occurs at temperatures of below 37° C. (in a reversible manner) |
| DMSO | DMSO | Thermal crystallization | 100% DMSO freezes at a temperature below 18° C.; in embodiments with a mixture of water and DMSO, the freezing point is shifted |
| Pluronic | Pluronic F-127 | Thermal formation of hydrogel | Mixture of Pluronic and water is liquid below 10° C. and solid (or a hydrogel) above |
| Gelatine | gelatine | Thermal formation of hydrogel | Addition of gelatine to the fluidic sample or to the separation medium; gelling of gelatine occurs at temperatures of below 37° C. (in a reversible manner) |
| Collagen | collagen and acidic or alkaline solution | pH dependent hydrogel formation | Addition of acidic or alkaline solution to the fluidic sample and collagen to the separation medium (or vice versa); collagen forms a hydrogel in the neutral range and becomes liquid in the alkaline or acidic range |

-continued

| Name | Constituent(s) | Mechanism | Description |
| --- | --- | --- | --- |
| Chitin | chitosan and acidic solution | pH dependent hydrogel formation | Addition of acidic solution to the fluidic sample and chitosan to the separation medium (or vice versa); chitosan forms a hydrogel (chitin) in the acidic range and becomes liquid again in the alkaline range |
| Starch | starch | Increase of viscosity | Addition of starch dramatically increases the viscosity and limits diffusion of fluidic sample therein |
| Polyacrylamide | acrylamide and (for instance UV-) cross-linker | Polymerization (for instance chemically or UV-triggered cross-linking) | Addition of acrylamide to the fluidic sample and of a cross-linker to a separation medium (or vice versa); upon contact, a highly viscous gel or a gel with small pores is formed; in case of UV treatment, the cross-linker can be locally illuminated; also a complete illumination is possible, for instance when the UV-cross-linker is only applied locally at a defined position |
| Polymer solution | polymer | Increase of viscosity | Add to fluidic sample |

In an embodiment, the method comprises providing a separation medium for separating the fluidic sample on a carrier, injecting the fluidic sample to the separation medium (in particular thereby triggering the immobilizing), and after the immobilizing and the releasing, separating the fluidic sample by the separation medium (in particular by electrophoresis). For example, such a separation medium may be a gel strip or matrix in the example of gel electrophoresis, in particular applied (for instance printed) on the carrier. In case of liquid chromatography, the separation medium may be a chromatographic separation medium in or on a carrier such as a column tube. When the immobilization of the fluidic sample has been removed, the fluidic sample is again freely movable and therefore separable into different fractions by the separation medium.

In an embodiment, the method comprises only locally immobilizing the fluidic sample by the immobilizing agent while an environment of the fluidic sample and the immobilizing agent remains in an unchanged (for instance fluidic) state. Thus, in such an embodiment, the temporary immobilization substantially only affects the fluidic sample and the immobilizing agent itself while the environment remains unchanged (for instance fluidic) and thus freely movable also during maintaining the state of immobilization. This ensures that the separation device is only affected to a minimum and absolutely necessary degree (i.e. what concerns the fluidic sample) by the immobilization process. According to such an embodiment, the time interval during which the fluidic sample remains immobilized can be used for preparing a subsequent analysis or separation, for completing a previous analysis or separation, etc. Thus, the fluidic sample is prevented during a corresponding waiting time from undesirably spatially broadening or spatially defocusing to thereby avoid an undesired dilution or spatial broadening of the fluidic sample.

However, in other embodiments, an entire system may be immobilized temporarily (rather than only locally immobilizing a small portion thereof).

In an embodiment, the device comprises an electric field generating unit configured for generating an electric field for applying an electric force to the fluidic sample in a medium during and/or after the releasing, in particular for releasing the fluidic sample from the immobilized immobilizing agent and/or for separating and moving the fluidic sample towards a detector for detecting separated fractions of the fluidic sample. The electric field generating unit may serve to trigger release of the fluidic sample from the immobilized immobilizing agent by an electric release force. Moreover, a separation process in terms of gel electrophoresis for separating the released fluidic sample may move different fractions of the fluidic sample differently in an electric field generated by the (preferably the same) electric field generating unit to thereby accomplish separation of the fractions of the fluidic sample.

In an embodiment, the device comprises an injection unit for injecting the at least partly immobilized fluidic sample into a separation channel (for example a separation channel in which the fluidic sample is to be separated or a separation channel for guiding the fluidic sample to a sample separation unit for separation). Prior to, during and/or after such an injecting process, the previously immobilized fluidic sample may be re-mobilized and may therefore be prepared for subsequent separation. It is also possible to form a sequence of immobilized fluidic sample beads in a supply channel and to inject the fluidic sample beads one after the other into the separation channel for separation into fractions.

In an embodiment, the device comprises a compensation unit configured for—in particular computationally—at least partly compensating a deviation between a separation result in the presence of the immobilizing agent and a separation result in the absence of the immobilizing agent. Highly advantageously, immobilizing agents (for instance a combination of sodium alginate and calcium chloride) are disclosed which have an only very minor impact on the chemical environment of the fluidic sample during the pre-separation immobilization phase. However, in case that an immobilizing agent is implemented in exemplary embodiments which has a significant impact on the separation result, artifacts of the separation results due to the chemical influence of the immobilizing agent may be partially or completely eliminated by compensating or correcting the separation result in view of the mentioned impact. As a basis for such a compensation or correction, it is possible to model the behavior of the fluidic sample in the chemical environment with the immobilizing agent in comparison with its behavior in the absence of the immobilizing agent. Additionally or alternatively, such a compensation may be accomplished by using reference measurements (for instance with and without immobilizing agent) which may be stored for example in a database or lookup table. Also expert knowledge (such as expert rules) may be implemented for this purpose. By taking this measure, the precision of the separation result may be further improved.

In an embodiment, the device comprises a fluid drive configured for driving the fluidic sample in a mobile phase after the releasing towards a sample separation unit, and comprises the sample separation unit which may be configured for separating the fluidic sample. For example, such a fluid drive may be a high pressure pump configured for driving a mobile phase (i.e. a solvent or solvent composition) and the fluidic sample towards a sample separation unit. The sample separation unit may be a chromatographic column. Thus, the described arrangement corresponds to a sample analysis by liquid chromatography.

In an embodiment, the device is a microfluidic device. In the context of the present application, the term "microfluidic device" may particularly denote a device which is capable of analyzing or handling a fluidic sample having channels with a diameter in the order of magnitude of micrometers. Also flow rates may be in a range of microliters per minute. Such microfluidic devices may for instance be liquid chromatography devices or gel electrophoresis devices which are capable of handling small amounts of a fluidic sample.

Embodiments of the invention may be implemented in conventionally available HPLC systems, such as the Agilent 1200 Series Rapid Resolution LC system or the Agilent 120 HPLC series (both provided by the applicant Agilent Technologies).

One embodiment of a sample separation device comprises a pumping apparatus as fluid drive or mobile phase drive having a pump piston for reciprocation in a pump working chamber to compress liquid in the pump working chamber to a high pressure at which compressibility of the liquid becomes noticeable. This pumping apparatus may be configured to know (by means of operator's input, notification from another module of the instrument or similar) or elsewise derive solvent properties, which may be used to represent or retrieve actual properties of fluidic content, which is anticipated to be in a sampling apparatus.

The separation unit of the fluid separation apparatus preferably comprises a chromatographic column providing the stationary phase. The column may be a glass or steel tube (for instance with a diameter from 50 µm to 5 mm and a length of 1 cm to 1 m) or a microfluidic column (as disclosed for instance in EP 1577012 or the Agilent 1200 Series HPLC-Chip/MS System provided by the applicant Agilent Technologies). The individual components are retained by the stationary phase differently and at least partly separate from each other while they are propagating at different speeds through the column with the eluent. At the end of the column they elute one at a time or at least not entirely simultaneously. During the entire chromatography process the eluent may be also collected in a series of fractions. The stationary phase or adsorbent in column chromatography usually is a solid material. The most common stationary phase for column chromatography is silica gel, surface modified silica gel, followed by alumina. Cellulose powder has often been used in the past. Also possible are ion exchange chromatography, reversed-phase chromatography (RP), affinity chromatography or expanded bed adsorption (EBA). The stationary phases are usually finely ground powders or gels and/or are microporous for an increased surface.

The mobile phase (or eluent) can be a pure solvent or a mixture of different solvents (such as water and an organic solvent such as ACN, acetonitrile). It can be chosen for instance to minimize the retention of the compounds of interest and/or the amount of mobile phase to run the chromatography. The mobile phase can also be chosen so that the different compounds or fractions of the fluidic sample can be separated effectively. The mobile phase may comprise an organic solvent like for instance methanol or acetonitrile, often diluted with water. For gradient operation water and organic are delivered in separate bottles, from which the gradient pump delivers a programmed blend to the system. Other commonly used solvents may be isopropanol, tetrahydrofuran (THF), hexane, ethanol and/or any combination thereof or any combination of these with aforementioned solvents.

The fluidic sample may comprise but is not limited to any type of process liquid, natural sample like juice, body fluids like plasma or it may be the result of a reaction like from a fermentation broth.

The pressure, as generated by the fluid drive in the mobile phase may range from 2-200 MPa (20 to 2000 bar), in particular 10-150 MPa (20 to 1500 bar), and more particularly 50-120 MPa (500 to 1200 bar).

The sample separation device, for instance an HPLC system, may further comprise a detector for detecting separated compounds of the fluidic sample, a fractionating unit for outputting separated compounds of the fluidic sample, or any combination thereof. Further details of such an HPLC system are disclosed with respect to the Agilent 1200 Series Rapid Resolution LC system or the Agilent 120 HPLC series, both provided by the applicant Agilent Technologies.

Embodiments of the invention can be partly or entirely embodied or supported by one or more suitable software programs, which can be stored on or otherwise provided by any kind of data carrier, and which might be executed in or by any suitable data processing unit. Software programs or routines can be preferably applied in or by the control unit.

BRIEF DESCRIPTION OF DRAWINGS

Other objects and many of the attendant advantages of embodiments of the present invention will be readily appreciated and become better understood by reference to the following more detailed description of embodiments in connection with the accompanying drawings. Features that are substantially or functionally equal or similar will be referred to by the same reference signs.

The illustration in the drawing is schematic.

DETAILED DESCRIPTION

Before describing the figures in further detail, some basic considerations of the present invention will be summarized based on which exemplary embodiments have been developed.

According to an exemplary embodiment of the invention, delayed sample injection may be accomplished by a locally and temporarily generated immobilization of a fluidic sample, in particular triggered by a phase transition. More specifically, a method for sample injection or sample storage by locally generated phase transitions is provided.

According to an exemplary embodiment, a method for temporarily storing biological samples or other fluidic samples in a (micro)fluidic analysis system, more specifically a sample separation device, is provided. The fluidic sample may firstly be separated from the remaining fluidic system by a controlled in situ generation of a phase transition. In a subsequent procedure, the sample may be brought back in interaction with the fluidic analysis system, for example by reversing the phase transition or by traversing a substance which has undergone a phase transition.

In this context, a biological sample may be in particular a water based liquid comprising biological substances such as proteins, lipids, DNA, RNA, etc. Such a fluidic sample may be subject of a separation procedure for analyzing its composition, may be subject to purification, may be subject to reaction with one or more further substances, etc.

A microfluidic (analysis) system may be a fluidic analysis system composed of fluidic members such as channels, mixers, etc. and may serve for the purpose of preparing the fluidic (in particular biological) sample and/or to analyze the latter. Examples for such an analysis are electrophoresis, chromatography, etc. Such devices may involve closed microfluidic systems or open microfluidic systems, or even mixtures of both these concepts.

An injection may denote an intentional insertion of a fluidic (in particular biological) sample in a fluidic analysis system, more precisely a sample separation device.

Sample storage may denote a process of storing biological samples in a fluidic analysis system such as a sample separation device so that they can be actively injected and analyzed in response to a control command. Such a control command may trigger disintegration of a previously immobilized immobilizing agent interacting with the fluidic sample or removal of the fluidic sample out of the immobilized immobilizing agent.

Immobilization of immobilizing agent including the fluidic sample as well as removal of fluidic sample from immobilizing agent by disintegration of immobilizing agent may be triggered by a corresponding phase transition. Such a phase transition may be a transition of a material between different aggregate states, in particular solid state or phase, liquid state or phase and gaseous state or phase. More generally, a phase transition may also cover a transition changing special material properties. For instance, a transition towards a superconductive state or the formation of a hydrogel by polymerization, etc. may also denote phase transitions.

Embodiments of the invention described in the following are described for the example of a gel transition of hydrogels, more specifically a reaction between sodium alginate and calcium chloride. Gel formation of sodium alginate produced from alga can be triggered by the substitution of sodium by calcium ions, i.e. by an ion exchange. Descriptively speaking and without wishing to be bound to a specific theory, it is presently believed that the alginate hereby forms a three-dimensional polymer network having gaps which are filled with liquid (in particular water) and which may be denoted as a hydrogel.

Exemplary embodiments of the invention use the mentioned phase transition and optionally in addition the inverse effect in order to store fluidic samples in a focused condition in a microfluidic system so as to subsequently insert or inject the sample in an active or a passive process. For this purpose, a fluidic sample (in particular a biological sample) may be mixed with calcium chloride (as first constituent of the immobilizing agent) and is inserted into a sample separation device (which may be a microfluidic analysis system) comprising sodium alginate (as second constituent of the immobilizing agent). As soon as a contact is established between the first constituent and the second constituent of the immobilizing agent, a hydrogel is formed as a result of an interaction between sodium alginate and calcium chloride. Such a hydrogel surrounds and/or embeds the fluidic sample and thereby decouples the fluidic sample with regard to the fluidic environment. Descriptively speaking, the formed hydrogel barrier significantly and instantaneously slows down the interaction between fluidic sample and fluidic system, which interaction otherwise might occur immediately in the presence of two fully liquid phases in direct contact with one another. By taking this measure, the fluidic sample may be temporarily stored in a focused and immobilized state in which its ordinary capability and tendency of diffusing and thereby spatially broadening in the fluidic environment is significantly decreased. For instance in a scenario in which, prior to an analysis or separation of the fluidic sample, time-consuming preparation procedures need to be carried out (for instance supply of further samples, reagents, etc.), such a storage of the temporarily immobilized fluidic sample is of high advantage since it prevents smearing of the fluidic sample during the waiting time. Additionally, a local bond and/or fixation of the sample to the separation device may be established for increasing robustness against fluidic flow phenomena induced by pressure driven flows that may occur and are often observed in such microfluidic networks.

Moreover, due to time delays between supplying of the sample and execution of a separation or an analysis, accuracy and intensity of detection signals may be deteriorated in conventional approaches. Reasons for such time delays are for instance a delayed application of a driving force for the analysis (for instance an electrostatic force, a centrifugal force, pressure, temperature, etc.) as well as the time needed for preparing the analysis (for instance adjusting and aligning detectors or focusing of optical elements).

According to an exemplary embodiment of the invention, the immobilization of the fluidic sample allows bridging the mentioned time delays without deterioration of a detection signal. The latter is the result of the strong suppression of spatial broadening of the fluidic sample during storage thanks to the temporary immobilization. Apart from a passive injection by a diffusion through the hydrogel, application of a driving force for the analysis/separation and/or of other release forces may actively allow injection of the fluidic sample (for instance by the application of electrostatic forces and a resulting migration of charged biomolecules through the hydrogel barrier, or an ionic dissolution or disintegration of the hydrogel barrier).

One exemplary embodiment of the invention relates to electrophoresis in an open microfluidic system. Electrophoresis of charged biomolecules can be carried out in microchannels which are filled with a separation medium. After injection of the biomolecules in the microchannel, fractions of the fluidic sample are separated as a result of an applied electric field along the channel, more specifically are separated in accordance with different sizes of the fractions. It is in particular advantageous to carry out electrophoresis in an open microfluidic system. In such an embodiment, a separation medium applied on a planar carrier substitutes a separation medium applied to a microchannel.

The fluidic sample to be separated or analyzed can be injected in a contact-free way. Since some time may pass between injection of the fluidic sample and analysis or separation thereof (for example due to the alignment of the detection optics, the application of a separation voltage, etc.), it may happen due to flow along the line or due to the impact of a contact-free dispensed free flying droplet of fluidic sample on a separation medium that a strong and unlimited diffusion of the fluidic sample occurs, especially if the droplet diameter exceeds the height of the line. Such a spatial broadening may also broaden detection peaks after separation of the fluidic sample. This reduces the resolution of the separation or more generally of the analysis of the fluidic sample.

By applying calcium chloride to the fluidic sample and by applying sodium alginate to a separation medium, a respective sample droplet enriched with calcium chloride (or another first constituent of an immobilizing agent) may be, descriptively speaking, frozen in situ (more precisely may be embedded in and/or surrounded by a gel matrix) when reaching the separation medium enriched with the sodium alginate (or another second constituent of the immobilizing agent). Due to the calcium chloride in the fluidic sample, a part of the channel forms the hydrogel and separates the sample droplet with regard to the separation medium.

As a result, fluidic sample beads may thus be spatially focused in a channel. Consequently, the fluidic sample treated with the immobilizing agent in the described way is not spatially broadened or defocused and is of exactly or substantially the same dimension as the bead diameter established during a dispensing process for instance. Experiments have shown that even after a significant waiting time of for instance 20 minutes, the spatial range in which the fluidic sample is present is only increased to a very small or even minimum amount. A small increase of the spatial range in which the fluidic sample is present may be due to effects such as diffusion through the hydrogel and to a certain dissolution of the hydrogel over time.

Figure 1:
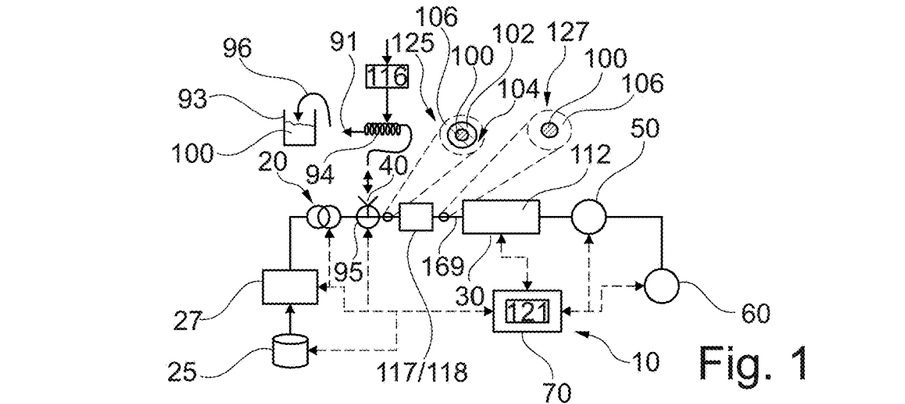
FIG. 1 shows a liquid sample separation device in accordance with embodiments of the present invention, particularly used in high performance liquid chromatography (HPLC).

Referring now in greater detail to the drawings, FIG. 1 depicts a general schematic of a liquid separation system as example for a sample separation device 10 according to an exemplary embodiment of the invention. A pump as fluid drive 20 receives a mobile phase from a solvent supply 25, typically via a degasser 27, which degases and thus reduces the amount of dissolved gases in the mobile phase. The mobile phase drive or fluid drive 20 drives the mobile phase through a sample separation unit 30 (such as a chromatographic column) comprising a stationary phase. A sampler or injection unit 40, implementing a fluidic valve 95, can be provided between the fluid drive 20 and the separation unit 30 in order to subject or add (often referred to as sample introduction) a sample fluid into the mobile phase. The stationary phase of the separation unit 30 is configured for separating compounds of the sample liquid. A detector 50 is provided for detecting separated compounds of the sample fluid. A fractionating unit 60 can be provided for outputting separated compounds of sample fluid.

While the mobile phase can be comprised of one solvent only, it may also be mixed from plural solvents. Such mixing might be a low pressure mixing and provided upstream of the fluid drive 20, so that the fluid drive 20 already receives and pumps the mixed solvents as the mobile phase. Alternatively, the fluid drive 20 may be comprised of plural individual pumping units each receiving and pumping a different solvent or mixture. The composition (mixture) of the mobile phase may be kept constant over time, the so called isocratic mode, or varied over time, the so called gradient mode.

A data processing unit or control unit 70, which can be a PC or workstation, may be coupled (as indicated by the dotted arrows) to one or more of the components in the sample separation device 10 in order to receive information and/or control operation. For example, the control unit 70 may control operation of the fluid drive 20 (for example setting control parameters) and receive therefrom information regarding the actual working conditions (such as output pressure, etc., at an outlet of the pump 20). The control unit 70 may also control operation of the solvent supply 25 (for example setting the solvent/s or solvent mixture to be supplied) and/or the degasser 27 (for example setting control parameters such as vacuum level) and might receive therefrom information regarding the actual working conditions (such as solvent composition supplied over time, vacuum level, etc.). The control unit 70 might further control operation of the sampling unit or injection unit 40 (for example controlling sample injection or synchronization of sample injection with operating conditions of the fluid drive 20). The separation unit 30 might also be controlled by the control unit 70 (for example selecting a specific flow path or column, setting operation temperature, etc.), and send—in return—information (for example operating conditions) to the control unit 70. Accordingly, the detector 50 might be controlled by the control unit 70 (for example with respect to spectral or wavelength settings, setting time constants, start/stop data acquisition), and send information (for example about the detected sample compounds) to the control unit 70. The control unit 70 might also control operation of the fractionating unit 60 (for example in conjunction with data received from the detector 50) and provide data back.

FIG. 1 also shows schematically how a sample accommodation volume 94 (such as a sample loop) can be filled with a fluidic sample 100. For instance, a needle 91 may be temporarily driven out of a needle seat (not shown in FIG. 1) of the injection unit 40 and may be temporarily immersed (see reference numeral 96) into fluidic sample 100 in a vial or other fluid container 93. An aliquot of the fluidic sample 100 may then be drawn into the sample accommodation volume 94 via the needle 91.

The described procedure may involve the need that fluidic sample 100 filling for instance only part of sample accommodation volume 94 has to wait a certain waiting time between completion of the intaking procedure from the fluid container 93 into the sample accommodation volume 94 and the injection of the fluidic sample 100 from the sample accommodation volume 94 into the flow path between the fluid drive 20 and the separation unit 30. During this waiting time, the fluidic sample 100 may spatially broaden within the spatial expansion of the sample accommodation volume 94. This may result in a reduction of the accuracy of the separation process.

In order to avoid the mentioned reduction of the separation accuracy, an exemplary embodiment of the invention implements an immobilization unit 116 in the sample separation device 10. In the embodiment of FIG. 1, the immobilization unit 116 may be configured for immobilizing the fluidic sample 100 while waiting in the sample accommodation volume 94 for injection and subsequent separation. More specifically, the immobilization unit 116 may be configured for embedding or enclosing the fluidic sample 100 in the sample accommodation volume 94 by an immobilizing agent 102 for inhibiting spatial broadening of the fluidic sample 100. In the shown embodiment, the immobilization may be accomplished by enclosing the fluidic sample 100 in the sample accommodation volume 94 by a closed shell of immobilizing agent 102, see detail 125. As shown in detail 125, one or more beads 104 may be formed comprising a core with fluidic sample 100 surrounded by a shell of immobilized (for instance gelled) immobilizing agent 102. The formation of these beads 104 may occur in the sample accommodation volume 94, i.e. at the beginning of the waiting time. The fluidic sample 100 is therefore safely protected from spatially broadening in the sample accommodation volume 94 due to diffusion effects and the like during the waiting time. Descriptively speaking, the immobilized fluidic sample 100 may be shielded with regard to a fluidic medium (such as a mobile phase, i.e. a solvent or solvent composition) in an environment of the immobilizing agent 102 by immobilizing the fluidic sample 100 in a spatially confined way. In order to activate the immobilization, an immobilizing phase transition of the immobilizing agent 102 may be forced for immobilizing the fluidic sample 100. This may be done by triggering the immobilizing phase transition of the immobilizing agent 102 into a gel phase. Descriptively speaking, the fluidic sample 100 will then be surrounded by a gel shell (and/or embedded in a gel matrix) preventing or inhibiting free diffusion of the fluidic sample 100.

After injection of the one or more beads 104 by switching fluidic valve 95 into the flow path between fluid drive 20 and separation unit 30, sample separation shall be started. The mentioned flow path corresponds to a separation channel 169 in which the fluidic sample 100 is to be separated. For the purpose of enabling separation of the fluidic sample 100, the fluidic sample 100 of the one or more beads 104 should be re-mobilized. This can be accomplished by a release unit 117 and/or by a disintegration unit 118 which is/are here arranged in the flow path between fluid drive 20 and separation unit 30 and which is/are configured for releasing the fluidic sample 100 from the immobilizing agent 102. Additionally or alternatively, re-mobilization of the fluidic sample 100 forming part of the bead(s) 104 may also be carried out before the fluidic sample 100 is transferred from the sample accommodation volume 94 into the flow path, for instance still in the sample accommodation volume 94 after expiry of the waiting time.

For instance, the disintegration unit 118 may be configured for releasing the fluidic sample 100 from the immobilized immobilizing agent 102 being previously in a gel phase by a temperature increase destroying the shell. By an appropriate temperature increase of the one or more beads 104 caused by the disintegration unit 118, the gel shell of the immobilized immobilizing agent 102 may become liquid and may thereby release the fluidic sample 100 which has been previously enclosed therein. Additionally or alternatively, disintegration of the immobilized immobilizing agent 102 may also be triggered chemically, i.e. by the addition of one or more chemicals resulting in the disintegration of the immobilized immobilizing agent 102.

Release of the fluidic sample 100 from the immobilized immobilizing agent 102 may be accomplished, additionally or alternatively, by release unit 117. For example, the release may be triggered by the release unit 117 by applying an electric release force triggering a diffusion like migration of at least part of electrically charged particles of the fluidic sample 100 through the gel shell of the immobilized immobilizing agent 102. It has turned out that the application of an electric force to the beads 104 may cause charged particles of the fluidic sample 100 to move through the immobilized immobilizing agent 102 so as to be released and freed for subsequent separation independently of the immobilizing agent 102.

Concluding, the fluidic sample 100 may be handled in sample separation device 10 in such a way that it is firstly immobilized by causing a phase transition of immobilizing agent 102 into a gel phase to thereby inhibit spatial broadening of the fluidic sample 100 during a waiting time until injection is carried out and an actual separation procedure is started. Subsequently, the fluidic sample 100 is then released from the immobilizing agent 102, for instance by causing a further phase change of the latter into a liquid phase by disintegration unit 118 and/or by promoting diffusion of the fluidic sample 100 through the immobilizing agent 102 by an electric release force applied under control of release unit 117. After this release, the shown embodiment accomplishes a chromatographic separation of the released fluidic sample 100 by chromatographic separation medium 112 (such as a stationary phase) in separation unit 30 (such as a chromatographic separation column). Briefly before and during separation, the fluidic sample 100 is carried within fluidic medium 106, such as a mobile phase. The fluidic sample 100 gets in direct contact with the fluidic medium 106 upon releasing the fluidic sample 100 from the immobilizing agent 102, see detail 127.

As indicated schematically in FIG. 1 as well, the sample separation device 10 may further comprise a compensation unit 121 (which is here embodied as part of control unit 70) configured for computationally compensating a deviation between a separation result in the presence of the immobilizing agent 102 and a separation result in the absence of the immobilizing agent 102. More specifically, the presence of the immobilizing agent 102 may slightly influence the chemical conditions under which the fluidic sample 100 is present. This may, in turn, have a slight influence on the separation characteristic of the fluidic sample 100. In order to avoid an influence of such and other effects on the accuracy of the separation of the fluidic sample 100, such effects may be taken into account and compensated by a corrective calculation carried out by the compensation unit 121. Reference measurements, theoretical models and/or other experimental and/or historic data as well as expert knowledge may be taken into account in the framework of such a compensation procedure.

Figures 2, 2A:
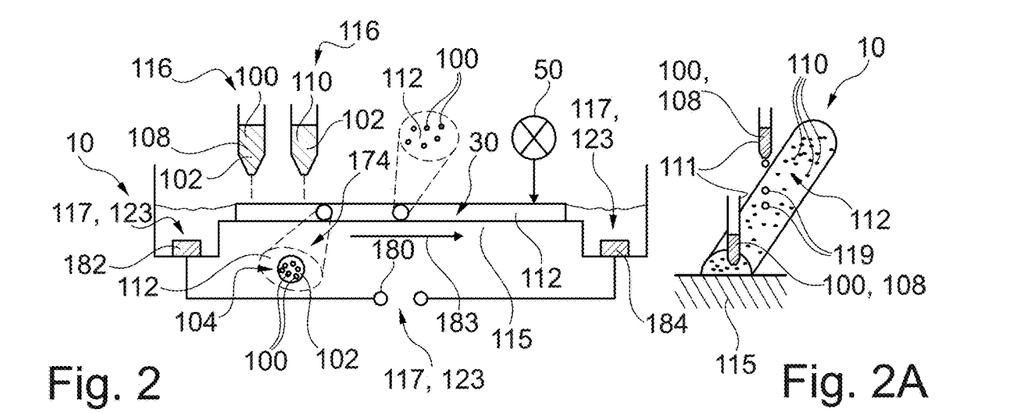
FIG. 2 shows a liquid sample separation device in accordance with embodiments of the present invention, particularly used in gel electrophoresis.
FIG. 2A shows a three dimensional view of part of a liquid sample separation device in accordance with embodiments of the present invention, illustrating an embodiment similar to FIG. 2 and showing some alternatives.

FIG. 2 shows a liquid sample separation device 10 in accordance with embodiments of the present invention, particularly used in gel electrophoresis.

Before FIG. 2 is described in further detail, some further chemical details about establishing immobilization of both fluidic sample 100 and immobilizing agent 102 will be explained. In preferred embodiments, the immobilizing agent 102 comprises a first constituent 108 (for instance calcium chloride) and a second constituent 110 (for instance sodium alginate) which are configured so that the immobilizing agent 102 is immobilized by a contact or interaction between the first constituent 108 and the second constituent 110, since this causes an immobilizing chemical reaction between the constituents 108, 110. Such a chemical reaction may involve an ion exchange between a calcium ion of the first constituent 108 and a sodium ion of the second constituent 110 and a resulting hydrogel formation. For the purpose of simultaneously ensuring immobilization of the fluidic sample 100 when the immobilizing agent 102 is immobilized, it may be highly advantageous that the fluidic sample 100 is mixed with the first constituent 108 prior to the addition of the second constituent 110. This ensures that the fluidic sample 100 is in close spatial relationship with the first constituent 108 during the immobilization process. The prepared mixture of fluidic sample 100 and first constituent 108 may be applied to a medium 112 (a gel used for gel electrophoresis separation in the embodiment of FIG. 2) which already comprises or is now supplied with the second constituent 110. During this application procedure, the immobilization may be instantaneously triggered as soon as the first constituent 108 (with the fluidic sample 100 mixed therewith) gets in contact with the second constituent 110 in the medium 112. As a result, the immobilization reaction is spatially strictly controllable. Thus, the fluidic sample 100 is only locally immobilized by the immobilizing agent 102 while an environment of the fluidic sample 100 and of the immobilizing agent 102 remain in an unchanged state.

After the immobilizing, preparation tasks for a subsequent separation of the fluidic sample 100 may be carried out (for instance an oil film may be formed) without running the risk that the fluidic sample 100 significantly spatially broadens during a corresponding waiting time. When the preparation is completed, release of the fluidic sample 100 from the matrix of the immobilized immobilizing agent 102 can be triggered. For instance, this can be done by switching on an electric field causing charged particles of the fluidic sample 100 to diffuse through the gel type immobilizing agent 102 due to the exerted electric force generated by the electric field. After the immobilizing, the preparing and the releasing, the method may advance by separating the re-mobilized fluidic sample 100 by the separation medium 112 in accordance with the principle of gel electrophoresis.

Hence, FIG. 2 shows an example of a gel electrophoresis analysis according to an exemplary embodiment of the invention. A gel is applied as electrophoretic separation medium 112 on a carrier 115. As can be taken from FIG. 2, the fluidic sample 100 (being present in a vial, pipette or contact(-free) dispenser of immobilizing unit 116) may already be premixed with the first constituent 108 of the immobilizing agent 102. As can furthermore be taken from FIG. 2, the second constituent 110 of the immobilizing agent 102 may be inserted into the separation medium 112 (via a further vial, pipette or contact(-free) dispenser of immobilizing unit 116). After injecting the mixture of the fluidic sample 100 and the first constituent 108 of the immobilizing agent 102 into the separation medium 112 being provided with the second constituent 110 of the immobilizing agent 102, hydrogel formation occurs so that the fluidic sample 100 is embedded in a highly viscous hydrogel matrix which is formed by a chemical reaction between the first constituent 108 and the second constituent 110 of the immobilizing agent 102. As can be taken from detail 174 in FIG. 2, the fluidic sample 100 is immobilized in the hydrogel matrix and is therefore prevented from spatial broadening. When the actual electrophoresis experiment shall be started, the fluidic sample 100 may be freed from its hydrogel matrix to be again mobile so as to be separable according to the principle of gel electrophoresis. Freeing the fluidic sample 100 from the matrix of the immobilizing agent 102 so as to become again freely movable can be accomplished actively and/or passively.

In a passive implementation, it is possible to simply wait until the hydrogel has disintegrated or the fluidic sample 100 has diffused through the hydrogel material into the surrounding fluidic medium, i.e. separation medium 112. In an active implementation, it is possible to apply an electric field for forcing electrically charged particles of the fluidic sample 100 to move through the hydrogel under the influence of an electric release force (for instance generated by applying an electric voltage by voltage source 180 operating electrophoresis electrodes 182, 184). The electric field generated by electric field generation unit 123 (composed of voltage source 180 and electrodes 182, 184) hence generates a release force acting on the fluidic sample 100 in a bead 104. Advantageously, the electric field generating unit 123 is configured for generating an electric field for applying an electric force to the fluidic sample 100 in medium 112 during and after the releasing. The mentioned electric field causes charged particles of the fluidic sample 100 to be released or removed from the immobilized immobilizing agent 102. Advantageously, the mentioned electric field also causes released charged particles of the fluidic sample 100 to be moved towards a detector 50 for detecting separated fractions of the fluidic sample 100. In other words, the electric field generating unit 123 allows generating an electric field which performs both tasks of releasing the fluidic sample 100 from the immobilized immobilizing agent 102 and of separating the released fluidic sample 100. Thus, the electric field generating unit 123 when operated as described also functions as a release unit 117 for releasing the fluidic sample 100 from the immobilized immobilizing agent 102. A motion direction of the released fluidic sample 100 during separation is indicated by reference numeral 183. Hence, the released fluidic sample 100 may then be separated into fractions of different size and charge according to the principle of electrophoresis. The individual fractions may be detected in detector 50, for instance optically.

FIG. 2A shows a three dimensional view of part of a liquid sample separation device 10 in accordance with embodiments of the present invention, illustrating an embodiment similar to FIG. 2 but showing some alternatives.

Firstly, FIG. 2A shows that the separation medium 112 (electrophoresis gel in the embodiment of FIG. 2A) can be directly applied as a strip on planar support surface or carrier 115. Secondly, FIG. 2A shows that the second constituent 110 (for instance sodium alginate) can be already mixed with the separation medium 112 prior to applying the separation medium 112 to support surface or carrier 115. Moreover, FIG. 2A illustrates that a storage container 111 (such as a needle, syringe, pipette, nozzle, etc.) can inject the fluidic sample 100 being already pre-mixed with the first constituent 108 (for instance calcium chloride) directly into the separation medium 112. In particular, an opening of the storage container 111 may be immersed into the medium 112. Alternatively, an opening of storage container 111 may be spaced with regard to a surface of the separation medium 112 and may eject droplets 119 of the fluidic sample 100 premixed with the first constituent 108, for instance by a printing process. In other words, fluidic sample 100 may be directly injected into a freestanding or exposed (in particular gel-type and/or liquid) separation medium 112. Due to the addition of two (or more) components or constituents 108, 110 of an immobilizing agent 102, immobilization of the fluidic sample 100 may occur substantially immediately after initial contact between the constituents 108, 110, one of which being premixed with the fluidic sample 100. Such an instant temporary and releasable immobilization of the fluidic sample 100 upon initial injection into separation medium 112 may prevent unintentional spatial broadening of the fluidic sample 100 in the separation medium 112 and may thereby ensure substantially identical start conditions of different portions of the fluidic sample 100 at the beginning of a subsequent separation procedure of separating the fluidic sample 100 into fractions.

Figure 3:
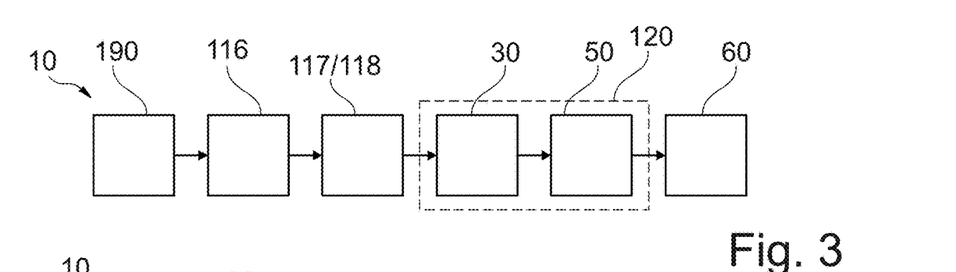
FIG. 3 schematically illustrates a sample separation device according to an exemplary embodiment of the invention.

FIG. 3 schematically illustrates a sample separation device 10 according to an exemplary embodiment of the invention.

FIG. 3 shows a process flow according to an exemplary embodiment of the invention. After supply of the fluidic sample 100 (see box 190), the fluidic sample 100 may be made subject to a temporary immobilization by immobilization unit 116. After a required waiting time has expired, the fluidic sample 100 may be removed or released from the immobilizing agent 102 by disintegration in a disintegrating unit 118 and/or by applying a release force by release unit 117 (in this case, disintegration of the immobilizing agent 102 is not necessary, but additionally possible). Thereafter, the fluidic sample 100, which is now capable again to freely move, can be made subject to an analysis in an analysis unit 120. In the shown embodiment, the analysis unit 120 comprises a separation unit 30 for separating the fluidic sample 100 into its fractions. Subsequently, a detection unit or detector 50 of analysis unit 120 may detect the separated fractions of the fluidic sample 100. Optionally, the separated fractions of the fluidic sample 100 may be fractioned by a fractioner 60.

Figure 4:
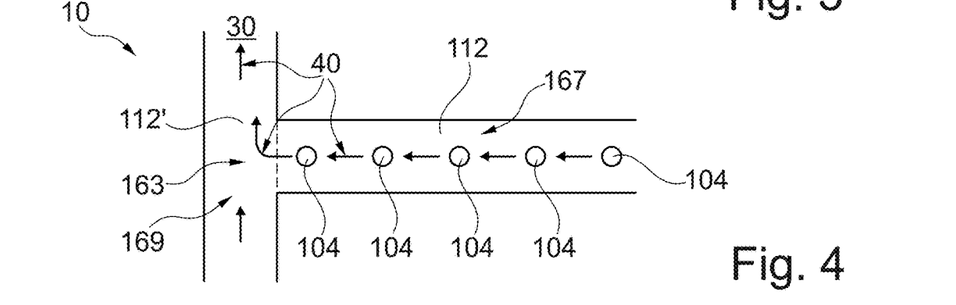
FIG. 4 illustrates part of a sample separation device according to an exemplary embodiment of the invention in which a number of gel beads with immobilized fluidic sample are sequentially injected into a separation channel for subsequent separation of the fluidic sample in a respective one of the beads.

FIG. 4 illustrates part of a sample separation device 10 according to an exemplary embodiment of the invention in which a number of gel beads 104 with immobilized (i.e. confined within immobilized immobilizing agent 102) fluidic sample 100 are sequentially injected from a supply channel 167 into a separation channel 169 for subsequent separation of the fluidic sample 100 into respective fractions.

An injection unit 40 (which is only shown schematically in FIG. 4 as arrows indicating a flow direction of the beads 104 and the fluidic sample 100, respectively) is provided for injecting the temporarily immobilized and subsequently released fluidic sample 100 inside of the beads 104 into separation channel 169. The injection unit 40 hence serves for injecting the immobilized fluidic sample 100 into separation channel 169 for guiding the fluidic sample 100 to sample separation unit 30. The separation channel 169 can be a channel or fluidic conduit in which the fluidic sample 100 is to be separated, or can be a separation channel 169 for guiding the fluidic sample 100 to a sample separation unit 30 (not shown in FIG. 4). As can be taken from FIG. 4, the sequence of beads 104 may be driven along the supply channel 167 in an immobilized state. In a transition region 163 at a fluidic interface between the supply channel 167 and the separation channel 169, the fluidic sample 100 may be released from the immobilized state (for instance by changing the chemical environment for disintegrating the immobilizing agent 102, by increasing the temperature for liquefying the previously gel type or solid type immobilizing agent 102, and/or by applying an electric field causing the fluidic sample 100 to migrate or diffuse out of the matrix of the still solid or gelled immobilizing agent 102). Hence, the individual beads 104 may wait in the supply channel 167 until the separation apparatus 10 is ready for separating (in particular by electrophoresis) fluidic sample 100 from a respectively next bead 104 in or downstream of the separation channel 169. During this waiting time, the immobilized fluidic sample 100 is protected from undesirably spatially broadening. By taking this measure, the accuracy of the separation process may be improved.

It is for instance possible that the supply channel 167 transports the fluidic sample 100 within the immobilizing agent 102 from a first sample separation device (for instance a liquid chromatography sample separation device such as an HPLC, not shown in FIG. 4) for a subsequent second sample separation device (for instance a gel electrophoresis apparatus downstream of separation channel 169, not shown in FIG. 4). Release of the fluidic sample 100 from the immobilized immobilizing agent 102 and thus out of the beads 104 may also be accomplished by changing a medium surrounding the beads 104 in the supply channel 167 and in the separation channel 169. Medium 112 in the supply channel 167 may be selected so that the beads 104 remain in a gel phase in the supply channel 167. Moreover, medium 112' in the separation channel 163 may be selected so that the beads 104 are disintegrated or transferred into a liquid phase, thereby releasing the fluidic sample 100 from the matrix of the immobilized immobilizing agent 102.

Figure 5:
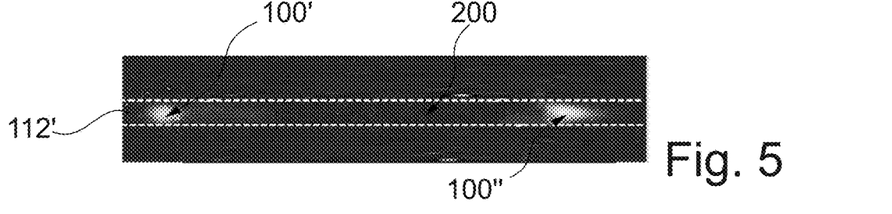
FIG. 5 illustrates a fluidic sample injected into a channel without spatial focusing.

FIG. 5 illustrates two droplets of fluidic sample injected into a channel 200 without spatial focusing. One injection appears to be broader than the other one, demonstrating the wide range of spatial broadening and thus poor reproducibility. The injection at right end of the channel 200 shows a spatially broadened or smeared fluidic sample 100". Thus, FIG. 5 illustrates a phenomenon which exemplary embodiments of the invention intend to overcome.

More precisely, FIG. 5 shows with reference numerals 100', 100" two DNA sample droplets (30 nucleotides; fluorescently labeled with Rh6G) injected in a contact-free way into a separation medium 112'. The dotted lines in FIG. 5 correspond to the channel-like structure of the separation medium 112' with planar support surface or carrier. The distance between the dotted lines is for instance in a range between 500 µm and 600 µm. The dye marked sample droplets shown with reference numerals 100', 100" have been excited by a laser and have been detected by a camera filter setup. The droplet on the right-hand side (see reference numeral 100") is spatially broadened compared to the droplet on the left-hand side (see reference numeral 100') due to a flow within the line. The droplet on the left-hand side is spatially focused. The fluidic sample 100', 100" broadens (in the sense of forming a deviation of an ideal droplet shape or diameter) due to diffusion and the kinetic impact of the respective droplet 102 while penetrating the separation medium 112.

Figure 6:
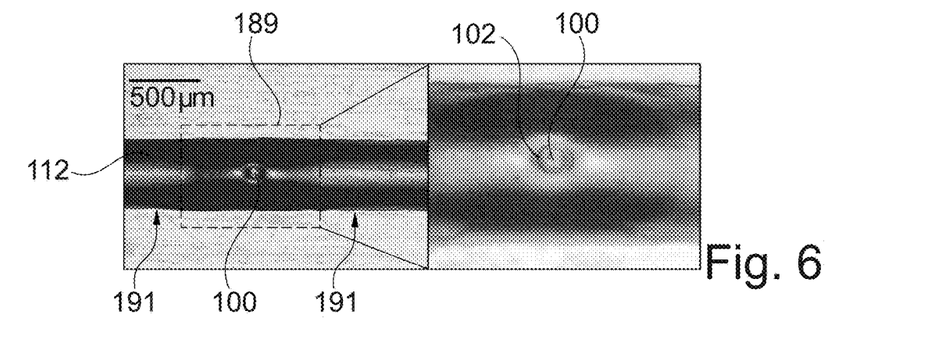
FIG. 6 illustrates a separation medium with a spatially focused fluidic sample according to an exemplary embodiment of the invention.

FIG. 6 illustrates a separation medium 112 with a spatially focused fluidic sample 100 according to an exemplary embodiment of the invention.

In FIG. 6, a gelled portion is indicated with a dotted frame and by reference numeral 189. A non-gelled portion is indicated by reference numeral 191. The separation medium 112 of FIG. 6 has been mixed with 0.54% (w/w) sodium alginate (108). The fluidic sample 100 has been mixed with the second constituent 110 of the immobilizing agent 102 which is calcium chloride (100 mM). After a contact-free metering of the sample droplet (see reference numeral 100) in the channel, a sodium-calcium ion exchange occurs, which results in the formation of a hydrogel. The spatial range of the formed alginate-hydrogel-portion is for instance about 1 mm. On the image on the right-hand side of FIG. 6, the fluidic sample 100 can be clearly separated from the hydrogel. Thus, the injection width is ideally identical to the maximum diameter of the metered droplet.

Figure 7:
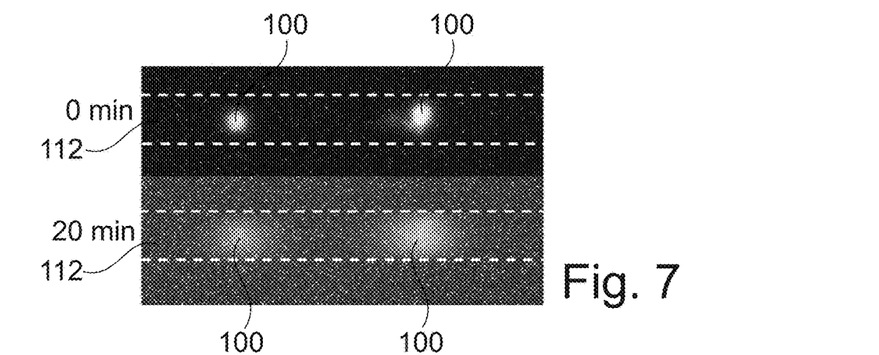
FIG. 7 illustrates a spatially focused fluidic sample during spatial focusing and at a later point of time according to an exemplary embodiment of the invention.

FIG. 7 illustrates a spatially focused fluidic sample 100 during spatial focusing and at a later point of time (i.e. 20 minutes later) according to an exemplary embodiment of the invention.

FIG. 7 shows a setup corresponding to FIG. 5, however now with the implementation of the concept of temporary immobilization of a fluidic sample 100 by an immobilizing agent 102. According to FIG. 7, the fluidic sample 100 has been mixed with calcium chloride ($CaCl_2$)), and the separation medium 112 has been mixed with sodium alginate. The two injection droplets of fluidic sample 100 are very focused and not broadened as in FIG. 5. The dotted lines in FIG. 7 again indicate the channel-like structure of the separation medium 112 on a planar substrate 115. The distance between the two dotted lines corresponds to about 500 µm to 600 µm. Even after a 20 minutes waiting time, the injection droplets are only slightly increased in dimension due to the effect of diffusion.

Figure 8:
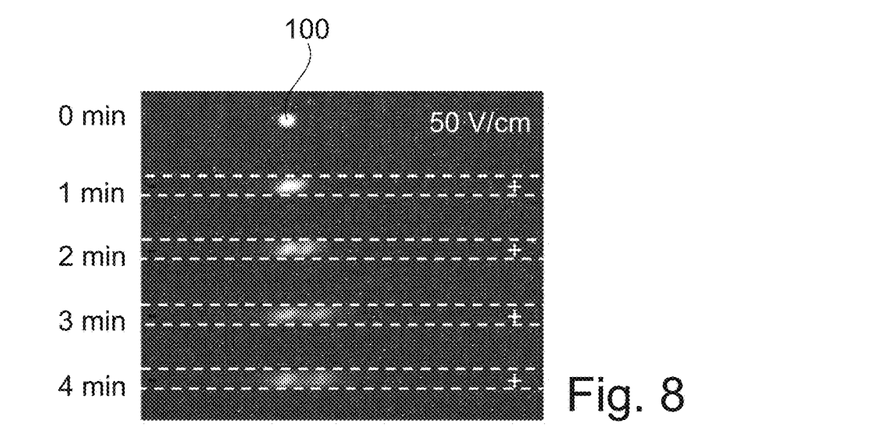
FIG. 8 illustrates separation of a spatially focused fluidic sample according to an exemplary embodiment of the invention.

FIG. 8 illustrates separation of a spatially focused fluidic sample 100 according to an exemplary embodiment of the invention.

For the embodiment of FIG. 8, a mixture of two single-stranded DNA fragments (30 and 56 nucleotides, fluorescent label: Rhodamine 6G) has been mixed with 50 mM $CaCl_2$) and has been injected in the separation medium 112 mixed with 0.54% (w/w) sodium alginate. These media have been present in an open microfluidic system and have been separated at 50 V/cm. The contact-free metered injection spot has been very focused at the beginning and has been separated with regard to the separation medium by the hydrogel barrier. By the application of a voltage, the biomolecules can be actively moved through the hydrogel barrier and may be injected into the separation medium. After a migration time of 2 minutes, a clear separation of the two fragments is visible, which shows that the method is working (compare FIG. 8).

FIG. 8 shows a fluidic sample 100 being contact-free injected in a microfluidic electrophoresis system using a droplet printer. The sample comprises two single-stranded DNA fragments (30 and 56 nucleotides, label: Rhodamine 6G) and has been mixed with 50 mM calcium chloride. The separation medium establishing the open microfluidic system has been mixed with 0.54% (w/w) sodium alginate. The images of FIG. 8 have been captured during the separation at 50 V/cm at different points of time. The images have been aligned based on the smaller fragment. After 2 minutes of migration, the separation of the two fragments is clearly visible and shows that the described method works properly.

It should be noted that the term "comprising" does not exclude other elements or features and the term "a" or "an" does not exclude a plurality. Also elements described in association with different embodiments may be combined. It should also be noted that reference signs in the claims shall not be construed as limiting the scope of the claims.

The invention claimed is:

1. A method of handling a fluidic sample in a sample separation device, the method comprising:
   providing a fluidic sample in a surrounding medium;
   at least partly immobilizing the fluidic sample by an immobilizing agent inhibiting spatial broadening of the fluidic sample, by triggering an immobilizing phase transition of the immobilizing agent to produce an immobilized immobilizing agent,
      wherein the surrounding medium surrounds the fluidic sample and the immobilized immobilizing agent, and the immobilized immobilizing agent separates the fluidic sample from the surrounding medium and inhibits analytical separation of the fluidic sample; and
   subsequently at least partly releasing the fluidic sample from the immobilized immobilizing agent to contact the fluidic sample with the surrounding medium.

2. The method according to claim 1, comprising at least one of the following features:
   wherein the releasing comprises triggering the releasing by applying a release force triggering migration or diffusion of at least part of the fluidic sample out of or through the immobilized immobilizing agent;
   wherein the releasing comprises triggering the releasing by applying an electric release force triggering migration or diffusion of at least part of the fluidic sample out of or through the immobilized immobilizing agent;
   wherein the releasing comprises triggering the releasing by at least partly disintegrating the immobilized immobilizing agent;
   wherein the releasing comprises triggering the releasing by at least partly disintegrating the immobilized immobilizing agent thermally, electrically and/or chemically;
   wherein the releasing comprises waiting for a spontaneous disintegration of the immobilized immobilizing agent.

3. The method according to claim 1, wherein the immobilizing comprises embedding at least part of the fluidic sample in the immobilizing agent and/or enclosing at least part of the fluidic sample by the immobilizing agent.

4. The method according to claim 1, wherein the releasing comprises triggering a disintegrating phase transition of the immobilizing agent.

5. The method according to claim 1, wherein the releasing comprises triggering a disintegrating phase transition of the immobilized immobilizing agent, and the disintegrating phase transition is inverse to the immobilizing phase transition.

6. The method according to claim 1, comprising at least one of the following features:
   wherein the immobilizing comprises forming at least one bead comprising the fluidic sample and the immobilizing agent;
   wherein the immobilizing comprises shielding the fluidic sample with regard to the surrounding medium;
   wherein the immobilizing comprises shielding the immobilized fluidic sample with regard to the surrounding medium.

7. The method according to claim 1, wherein the fluidic sample is a biological sample.

8. The method according to claim 1, wherein the method comprises separating the fluidic sample after the releasing.

9. The method according to claim 1, wherein the immobilizing agent comprises a first constituent and a second constituent being configured so that the immobilizing agent is immobilized by an interaction between the first constituent and the second constituent.

10. The method according to claim 9, comprising at least one of the following features:
    wherein the first constituent is calcium chloride or calcium glucate lactate, and the second constituent is sodium alginate;
    wherein the interaction triggering the immobilizing is an ion exchange between the first constituent and the second constituent;
    wherein the interaction triggering the immobilizing phase transition is a hydrogel formation with participation of the first constituent and the second constituent;
    wherein the first constituent and the second constituent are thrombin and fibrinogen;
    wherein one of the first constituent and the second constituent is a polymerizable substance and the other of the first constituent and the second constituent is a cross-linking agent;
    wherein the triggering the immobilizing phase transition comprises mixing the fluidic sample with the first constituent, and subsequently injecting the mixture into the surrounding medium, and wherein the surrounding medium comprises the second constituent;
    wherein the triggering the immobilizing phase transition comprises mixing the fluidic sample with the first constituent, and subsequently injecting the mixture into the surrounding medium, and wherein the surrounding medium comprises the second constituent and one selected from the group consisting of: a gel; an electrophoresis gel; a mobile phase; and a chromatographic mobile phase.

11. The method according to claim 1, comprising at least one of the following features:
    wherein the method comprises providing a separation medium for separating the fluidic sample on a carrier, supplying the fluidic sample to the separation medium, and after the immobilizing and the releasing, separating the fluidic sample by the separation medium;
    wherein the method comprises providing a separation medium for separating the fluidic sample on a carrier, supplying the fluidic sample to the separation medium, and after the immobilizing and the releasing, separating the fluidic sample by the separation medium by electrophoresis;
    wherein the immobilizing comprises only locally immobilizing the fluidic sample by the immobilizing agent while the surrounding medium remains in a fluidic state;
    wherein the method comprises, after the immobilizing, preparing a subsequent separation of the fluidic sample, and after the preparing and after the releasing, carrying out the separation of the fluidic sample;
    wherein the method comprises separating the fluidic sample by a separation medium, and the immobilizing is carried out before and/or after the separating;
    wherein the method comprises applying the fluidic sample on a planar carrier, and subsequently applying a separation medium on the planar carrier and for interaction with the fluidic sample.

12. The method according to claim 1, wherein the surrounding medium is selected from the group consisting of: a mobile phase or a solvent; and a separation medium.

13. The method according to claim 1, comprising at least one of:
    wherein the surrounding medium is a mobile phase or a solvent, and the method comprises, after the releasing, flowing the surrounding medium with the fluidic sample into contact with a chromatographic separation medium and separating the fluidic sample in the chromatographic separation medium by chromatography; and
    wherein the surrounding medium is an electrophoretic separation medium, and the method comprises, after the releasing, separating the fluidic sample in the electrophoretic separation medium by electrophoresis.

14. A sample separation device for separating a fluidic sample, the sample separation device comprising:
    an immobilization unit configured to at least partly immobilize the fluidic sample by an immobilizing agent inhibiting spatial broadening of the fluidic sample in a surrounding medium, the immobilization unit being configured to trigger an immobilizing phase transition of the immobilizing agent to produce an immobilized immobilizing agent;
    wherein the surrounding medium surrounds the fluidic sample and the immobilized immobilizing agent, and the immobilized immobilizing agent separates the fluidic sample from the surrounding medium and inhibits analytical separation of the fluidic sample; and
    a release unit configured to at least partly release the fluidic sample from the immobilized immobilizing agent to contact the fluidic sample with the surrounding medium.

15. The sample separation device according to claim 14, comprising at least one of the following features:
    wherein the release unit is configured for releasing the fluidic sample from the immobilizing agent by applying an electric field;
    wherein the release unit is configured for triggering an at least partial disintegration of the immobilizing agent after the immobilizing to thereby release the fluidic sample.

16. The sample separation device according to claim 15, comprising a fluid drive configured for driving the fluidic sample in a mobile phase after the releasing towards a sample separation unit, and the sample separation unit is configured for separating the fluidic sample.

17. The sample separation device according to claim 15, comprising an electric field generating unit configured for generating an electric field for applying an electric force to the fluidic sample in a medium during and/or after the releasing, for releasing the fluidic sample from the immobilized immobilizing agent and/or for separating and moving the fluidic sample towards a detector for detecting separated fractions of the fluidic sample.

18. The sample separation device according to claim 14, comprising an injection unit for injecting the at least partly immobilized fluidic sample into a separation channel in which the fluidic sample is to be separated or a separation channel for guiding the fluidic sample to a sample separation unit.

19. The sample separation device according to claim 14, comprising a compensation unit configured for at least partly compensating a deviation between a separation result in the presence of the immobilizing agent and a separation result in the absence of the immobilizing agent.

20. The sample separation device according to claim 14, comprising at least one of the following features:
    wherein the device is a microfluidic device;
    wherein the device comprises a detector configured to detect separated fractions of the fluidic sample;

wherein the device comprises a fractioner unit configured to collect separated fractions of the fluidic sample;

wherein the device comprises a degassing apparatus for degassing a mobile phase;

wherein the device comprises an injection unit for injecting the fluidic sample into mobile phase in a flow path between a fluid drive and a sample separation unit;

wherein the device is configured as one selected from the group consisting of: an electrophoresis sample separation device, a gel electrophoresis sample separation device, a chromatography sample separation device, a liquid chromatography sample separation device, a gas chromatography sample separation device, and a supercritical fluid chromatography sample separation device.

* * * * *